United States Patent [19]

Holtrop et al.

[11] Patent Number: 4,851,283

[45] Date of Patent: Jul. 25, 1989

[54] HEADLINERS HAVING IMPROVED SOUND-ABSORBING CHARACTERISTICS

[75] Inventors: James S. Holtrop; David Bowen, Jr., both of Chesterfield, Mo.

[73] Assignee: Monsanto Company, St. Louis, Mo.

[21] Appl. No.: 279,881

[22] Filed: Dec. 5, 1988

[51] Int. Cl.$^4$ ................................................. B32B 5/06
[52] U.S. Cl. ..................................... 428/284; 181/290; 181/294; 428/288; 428/297; 428/304.4; 428/340; 428/920
[58] Field of Search ............... 428/284, 288, 297, 340, 428/304.4, 316.6, 920; 181/290, 294, DIG. 1

[56] References Cited

U.S. PATENT DOCUMENTS 4,805,724 2/1989 Stoll et al. ........................ 181/294

Primary Examiner—James J. Bell
Attorney, Agent, or Firm—John W. Whisler

[57] ABSTRACT

Thermoformable laminates, suitable for use as automobile headliners, comprising a layer of non-woven fabric (acoustical pad bonded to one side of a foamed polymer sheet are disclosed. The non-woven fabric comprises a certain blend of staple fibers which provide an optimum balance of characteristics including cost and improved sound absorption characteristics which are important headliner characteristics, especially, for compact and subcompact automobile uses.

11 Claims, No Drawings

HEADLINERS HAVING IMPROVED SOUND-ABSORBING CHARACTERISTICS

BACKGROUND OF THE INVENTION

This invention relates to thermoformable laminates and, more particular, to thermoformable laminates having improved sound-absorbing characteristics as well as other desirable characteristics. The laminates are especially suited for making headliners for automobiles.

Laminates used as headlines for automobiles normally comprise a sheet of foamed polymer having a fabric bonded to the side thereof that faces the interior of the automobile. It is generally recognized in the automobile industry that laminates intended for use in making automotive headliners for gas-efficient, compact and subcompact automobiles must have a proper balance of certain characteristics. Specifically, the laminates must have the proper balance of: (1) cost, (2) weight, (3) thickness, (4) sound absorption acoustical performance, (5) moldability and (6) environmental stability. Cost, of course, must be as low as possible. Weight must be kept low as possible so as to provide maximum gas milage. Thickness must vary in order to provide maximum interior headroom while filling the space between the roof bows. Sound absorption acoustical performance should be as high as possible so as to provide the quietest possible ride. Thus, while adding more material (e.g. fabric) to the laminate usually improves the sound-absorbing performance of the headliner, it also adds to the cost, weight and thickness of the laminate. The laminate must also be moldable to a shape (headliner) having certain recessed regions of a minimum gage or thickness. Such minimum gage regions are necessary in order to facilitate installation of the headliner under interior trim where the headliner attaches to the automobile (e.g. along the outer perimeter of the headliner), to accommodate points at which the headliner contacts the automobile, such as roof bows of the automobile and to provide for mounting of interior parts to the headliner such as dome lights, sun visors, etc. The recessed regions are provided during molding of the laminate by means of mechanical pressure which compresses the designated regions to the desired minimum gage. Of course, it is equally important that the molded laminate be capable of retaining the minimum gage recessed regions. Thus, the density of the fabric component of the laminate must be great enough to resist the pressure of the expanding action of the foam component of the laminate during molding, but low enough to be capable of being compressed to the desired minimum gage by the mechanical pressing action of the mold. However, excessive fabric density is undesirable because it reduces the sound absorption performance of the laminate. Lastly, the laminate (headliner) must be environmentally stable, for example, it must not sag when the interior of the car reaches temperatures normally encountered during the summer months., e.g., 85° C.

Thermoformable laminates described in the prior art as being suitable for use in making headliners for automobiles typically comprise a sheet of foamed thermoplastic polymer (e.g. a foamed polystyrene) and a layer of non-woven fabric impregnated with resin bonded to one or both sides of the sheet. While these laminates have certain desirable characteristics, they do not have the proper balance of the above listed characteristics. For example, the laminates have only mediocre sound absorption characteristics because the resin component of the fabric causes the laminate to densify during molding and thereafter reflect rather than absorb sound.

SUMMARY OF THE INVENTION

In accordance with the present invention thermoformable laminates are provided which have the proper balance of the six above-listed characteristics and, in particular, have excellent sound absorption and moldability characteristics. The laminates of the invention comprise a layer of non-woven fabric (acoustical pad) bonded to at least one side of a sheet of suitable foamed thermoplastic polymer. The non-woven fabric comprises a blend of high melting staple fibers and low melting staple binder fibers. By careful selection of the fiber components used in the construction of the fabric and of the thermoplastic polymer, the performance and cost of headliners thermoformed from the laminates can be varied over a range suitable for most automotive needs.

As used herein, the term "high melting staple fibers" means fibers that do not melt or decompose or become tacky at temperatures below about 204° C. and the term "low melting staple binder fibers" means fibers having melting points above 90° C. and below 200° C. and, preferably, between 107° C. and 177° C.

DESCRIPTION OF THE PREFERRED EMBODIMENTS

The laminates of the present invention are described herein primarily with references to their use in making headliners for compact and subcompact automobiles where the headliners are of a minimum gauge so as to be as light as possible and where sound-absorbing characteristics are difficult to achieve. It will be, understood of course, that the laminates may be used in other appropriate applications, such as automobile door panels and package trays.

The non-woven fabric layer component of the laminates of the present invention preferably has a weight in the range of 5 to 25 oz/yd$^2$ (170 to 848 g/cm$^2$) and, most preferably, in the range of 10 to 18 oz/yd$^2$ (340 to 611 g/cm$^2$). The fabric comprises a blend of low melting staple binder fibers and high melting staple fibers. Representative high melting staple fibers useful for practicing the invention include polyester fibers, e.g. polyethylene terephthalate (PET) fibers, acrylic fibers, nylon fibers and celulosic fibers, such as celulosic fibers of the type used in making paper, or mixtures of such high melting fibers. Representative low melting staple binder fibers suitable for use in practicing the invention include polyethylene fibers, polypropylene fibers, certain polyester fibers and multicomponent fibers, such as Hoechst/Celanese sheath/core fibers, or mixtures of these fibers.

The average denier of the high melting staple fibers is in the range of 1 to 15 and, preferably, in the range of 3 to 8 and the length of the high melting staple fibers is in the range of 0.5 to 6 inches (1.2 to 15.2 cm) with a range of 1.25 to 5 inches (3.0 to 12.7 cm) being preferred. The denier and length of the high melting staple fibers are selected to impart an optimum balance of characteristics to the laminate and, in particular, sound-absorbing and stiffness characteristics. In general, if the thickness of the fabric remains constant, increasing the denier of the fibers of the fabric, improves the stiffness of the headliner and reduces its sound-absorbing characteristics. The denier and length of the low melting staple binder fibers is not critical and, therefore, may be of any value that does not adversely effect the sound-absorbing and other important characteristics of the laminate. If desired, the denier and length of the low melting staple binder fibers may be the same as that of the high melting staple fibers.

The melting point of the low melting staple binder fibers and the ratio of low melting staple binder fibers to high melting staple fibers are selected such that during thermoforming of the laminate at temperatures in the range of 120° C. to 150° C. the fabric does not densify (i.e. remains fluffy) except in those regions of the laminate where the fibers are subjected to a compression force of 5 lbs/in$^2$ (3515.5 kg/m$^2$) or more. In general, from 2 to 20% (preferably, 5 to 15%) by weight of the staple fiber blend should consist of the low melting staple binder fibers.

An essential feature of the laminates of the present invention is that, under thermoforming conditions, the low melting staple binder fibers of the fabric layer compressively bind only when subjected to a compression pressure of at least 5 lbs/in$^2$ (3515.5 kg/m$^2$). Thus, in the case of minimum-gauge, light-weight headliners, the low melting staple binder fibers bind the acoustic fabric only at recessed regions of the headliners that are compressed during molding to, for example, a thickness of 20 to 40 mils (0.5 to 1.0 mm). As set forth above, such regions include, for example, regions along the outer perimeter of the headliner where it attaches to the automobile and at regions along the width of the headliner where it contacts the roof bows of the automobile, etc. At regions of the headliner where molding does not exert enough force to cause significant gage reduction the fabric retains its full fluffy, open structure and maintains its sound absorption characteristics.

In addition to the blend of staple fibers just described, the non-woven fabric may contain other materials, including other staple fibers, which do not adversely affect the sound absorption characteristics of the laminate. Preferably, the fabric does not contain glass fibers because, when the laminate is subsequently cut to a desired headliner shape, fabric fibers will become air borne and air borne glass fibers create an unpleasant and hazardous working condition.

The foamed thermoplastic polymer sheet component of the laminates of the present invention can be made in a conventional manner from any well-known synthetic resin capable of forming a thermoformable foam. Preferred synthetic resins useful for this purpose include polystyrenes and copolymers thereof, polyolefins, polyester and nylons. Styrene-maleic anhydride copolymers are particularly preferred because they have higher softening and melting points than polystyrene. Conventional additives such as foam controlling agents and the like can be incorporated into the foam-forming resin.

The fabric layer may be bonded to the foamed thermoplastic polymer sheet in a conventional manner, for example, by using an adhesive conventionally used for this purpose such as an acrylic adhesive or by melt bonding.

Laminates of the present invention useful for making a minimum gauge headliner for a compact automobile typically will have a thickness in the range of 8 to 22 mm ith the fabric layer being of a thickness in the range of 3 to 10 mm. The laminate may be cut and thermoformed to the desired headliner shape using conventional technique. In the thermoforming operation, the laminate, for example, is heated to temperatures in the range of 260° to 325° F. (127° to 163° C.) for a period of time (e.g. 6 to 30 seconds) sufficient to begin expansion of the foam and to render the laminate pliable. The laminate is then placed in a matched mold and thermoformed to the shape or contour of the mold. The mold may be chilled or ambient temperature. The fabric layer is compressed to a thickness of about 20 to 40 mils (0.5 to 1.0 mm) at minimum gauge points by conforming to the mold configuration while at other points it is not significantly compressed. In fact, at other points the foam expands to fill the mold cavity. At points where the laminate has been sufficiently compressed during thermoforming to bind the fabric, the sound-absorbing characteristics will be less than at other points. On the other hand, only a very small portion of the total surface area of the laminate is compressed to the extent that the low melting binder fibers bond the fabric to the desired minimum gage.

The laminates of the present invention may include additional components. For example, a trim fabric or other fabric layer may be bonded to the acoustical fabric layer. The trim fabric faces the interior of the automobile and is usually soft and matches the interior trim of the car and is made of, for example, a nylon tricot knit with attached polyurethane foam. Also, additional layers may be bonded to the fabric layer for reinforcing the laminate and/or a fabric layer may be positioned between the foamed sheet and trim fabric. A material may be attached to the opposite side of the foam layer from the acoustical fabric layer for the purpose of adding additional composite strength or for enhancement of some other property.

The following Example is given to further illustrate the invention.

EXAMPLE 1

A styrene-maleic anhydride copolymer (Dylark®232 resin produced by Arco Chemical Co.) is used to prepare a foamable thermoplastic polymer sheet having a thickness of 300 mils (7.6 mm). A specially prepared non-woven fabric is bonded to the sheet using an acrylic adhesive to form a laminate having a thickness of about 500 mils (12.7 mm). The fabric has a weight of 16 oz/yd$^2$ (380.8 g/cm$^2$), a thickness of 200 mils (5 mm) and consists of a blend of polyester high melting staple fibers and low melting polypropylene staple fibers (85:15 on a weight basis). The fibers of the blend are 4 inches in length and have a denier of 5. The laminate structure is cut and thermoformed to the headliner shape for a compact car in a Dry Poll thermoformer. The structure is in the heater section for 20 seconds where it reached a surface temperature in the range of 260° F. to 325° F. (127° to 163° C.). The heated sheet is then moved into a matched mold which is at 70° F. (21° C.) and the mold closed. After 5 seconds the mold opens and the headliner is removed. The cooled laminate had good three-dimensional definition with no signs of delamination or cracking. The expanded and molded laminate is 660 mils (16.8 mm) at its maximum thickness and 150 mils (5 mm) at its minimum gauge points. Other than at minimum gage points, the fabric layer is generally fluffy, of an open structure and exhibited excellent sound absorbing acoustical characteristics. It also possesses environmental stability, i.e., good stiffness characteristics, and retains its shape (does not sag) when subjected to 100° C. heat for a period of one hour.

What is claimed is:

1. A thermoformable laminate comprising an acoustical layer of non-woven fabric bonded to at least one side of a sheet of foamed thermoplastic polymer, said fabric comprising a blend of low melting staple binder fibers and high melting staple fibers and having a weight ranging from 5 to 25 oz/yd$^2$ (170 to 848 g/m$^2$), said low melting binder fibers being characterized in comprising from 2 to 20% by weight of said blend and in having melting points above 90° C. and below 200° C. and said high melting fibers being characterized in not melting, decomposing or becoming tacky at temperatures below 400° F. (204° C.) and in having average deniers in the range of 1 to 15 and lengths in the range of 0.5 to 6 inches (1.2 to 15.2 cm), said deniers and lengths being selected to provide a laminate which, after thermoforming, has a desired balance of sound absorption and stiffness characteristics, said low melting binder fibers being selected such that during thermoforming of said laminate they do not bind such fabric unless subjected to a temperature in the range of 120° C. to 160° C. and a pressure of 5 psi (3515.5 kg/m$^2$).

2. The laminate of claim 1 wherein said thermoplastic polymer is a polystyrene copolymer.

3. The laminate of claim 2 wherein said copolymer is a styrene-maleic anhydride copolymer.

4. The laminate of claim 1 wherein said high melting fibers are polyester fibers or acrylic fibers or a mixture thereof.

5. The laminate of claim 1 wherein said low melting binder fibers are polyolefin fibers, polyester fibers or polyolefin/polyester multicomponent fibers.

6. The laminate of claim 1 wherein said fabric has a weight in the range of 10 to 18 oz/yd$^2$ (340 to 611 g/cm$^2$).

7. The laminate of claim 6 wherein said low melting fibers of said fabric having melting points in the range of 107° C. to 177° C.

8. The laminate of claim 7 wherein said high melting fibers have average deniers in the range of 3 to 8.

9. The laminate of claim 8 wherein said fibers of said fabric have length in the range of 1.25 to 5 inches (3 to 12.7 cm).

10. The laminate of claim 9 wherein from 5 to 15% by weight of said fibers of said fabric consists of low melting binder fiber.

11. The laminate of claim 6 wherein all the staple fibers of said blend are of the same denier and length.

* * * * *